United States Patent [19]
Whitehead

[11] Patent Number: 6,024,462
[45] Date of Patent: Feb. 15, 2000

[54] HIGH EFFICIENCY HIGH INTENSITY BACKLIGHTING OF GRAPHIC DISPLAYS

[75] Inventor: Lorne A. Whitehead, Vancouver, Canada

[73] Assignee: The University of British Columbia

[21] Appl. No.: 08/872,135

[22] Filed: Jun. 10, 1997

[51] Int. Cl.[7] ....................................................... F21V 8/00
[52] U.S. Cl. .............................. 362/31; 362/26; 362/330; 362/299; 362/298; 362/327
[58] Field of Search .................. 362/31, 26, 330, 362/297, 298, 299, 300, 301, 327, 339, 328, 329

[56] References Cited

U.S. PATENT DOCUMENTS

| | | | |
|---|---|---|---|
| 4,729,068 | 3/1988 | Ohe | 362/31 |
| 4,984,144 | 1/1991 | Cobb, Jr. et al. | |
| 4,989,125 | 1/1991 | Cobb, Jr. et al. | |
| 5,207,493 | 5/1993 | Murase et al. | 362/31 |
| 5,221,987 | 6/1993 | Laughlin | |
| 5,243,506 | 9/1993 | Whitehead | |
| 5,816,677 | 10/1998 | Kurematsu et al. | 362/31 |

Primary Examiner—Thomas M. Sember
Attorney, Agent, or Firm—Oyen Wiggs Green & Mutala

[57] ABSTRACT

An image display apparatus utilizing a hollow light guide having a non-diffuse highly reflective inner rear surface and a non-diffusely partially transmissive, non-diffusely partially reflective image-bearing front surface. A light source emits light into one end of the light guide. The image-bearing front surface has high reflectivity and low transmissivity adjacent portions of the image which are to be illuminated at relatively low intensity; and, has low reflectivity and high transmissivity adjacent portions of the image which are to be illuminated at relatively high intensity. This can, for example, be achieved by forming the image-bearing front surface of an outer image-bearing sheet laminated to an inner sheet of highly reflective perforated material. The inner sheet's apertures are distributed, or the size of the apertures is varied, such that any selected area on the inner sheet is apertured in proportion to the desired intensity of illumination of the image adjacent that selected area. Alternatively, the image-bearing front surface may be a half-tone imaged sheet of high reflectivity material, with the image being formed such that the density of the image varies in proportion to the desired intensity of illumination of the image adjacent. A prismatic film mounted in front of the image-bearing front surface redirects light into the perpendicular viewing direction.

9 Claims, 1 Drawing Sheet

HIGH EFFICIENCY HIGH INTENSITY BACKLIGHTING OF GRAPHIC DISPLAYS

TECHNICAL FIELD

A backlight for graphic images which yields a substantially higher ratio of luminous intensity to input power than conventional backlighted image displays.

BACKGROUND

Graphic images such as those seen in advertising signs are commonly illuminated by backlighting the image. It is desirable to backlight the image with the highest possible efficiency in order to improve the dynamic range of luminance values which can be perceived by persons viewing the backlighted image.

In conventional photography, only a relatively limited range of luminance values can be faithfully reproduced. Consequently, there are many visual situations which the eye can perceive well, but which cannot be captured photographically. Examples include most situations where sources of light are in the field of view, such as sunset scenes, scenes containing highly reflective ("shiny") surfaces, or night scenes containing neon signs, lamps, etc. The ability to display a larger dynamic range of luminance values would facilitate production of more visually effective graphic images, such as scenes of the aforementioned type which contain sources of light. This would in turn have value both aesthetically and in more effective advertising.

Ultra-high dynamic range images can be recorded in a single exposure by some conventional CCD array cameras, although not all CCD cameras can do so. However, two or three different exposures of the same scene can capture all the required information. An ultra-high dynamic range image can then be constructed in a fairly straight forward manner by overlapping multiple image layers obtained through more conventional photographic means. The problem is that, in order for an observer to perceive the full dynamic range of such an image, the image must be illuminated by an extremely bright backlight (at least 10 times brighter than conventional fluorescent light boxes, for example), which is impractical.

Conventional image backlighting techniques are inefficient in two important respects. First, a conventional backlight emits light with uniform brightness in all directions. Consequently, most of the emitted light is wasted, because the backlighted image is generally viewed only by persons having a restricted field of view which is typically within about 30 degrees of perpendicular horizontally, and within about 20 degrees of perpendicular vertically. If the emitted light could be concentrated within this range of angles, then a brightness increase of a factor of 4 could be attained. Second, most regions of most images are not very bright, meaning that very little incident light needs to be transmitted through such regions to persons viewing the image. In conventional image backlighting such non-transmitted light is absorbed and hence wasted. If such non-transmitted light could be effectively recycled, then typically another brightness increase factor of 5 could be attained. In combination, these two factors could enable a 20-fold increase in backlighting efficiency. In applications involving ultra high dynamic range images, such increased efficiency could yield a 10 times brighter peak luminance in a lighting structure requiring only 50% of the input power of a conventional prior art backlighted image.

SUMMARY OF INVENTION

The invention provides an image display apparatus which utilizes a hollow light guide having a non-diffuse highly reflective inner rear surface and a non-diffusely partially transmissive, non-diffusely partially reflective image-bearing front surface. A light source emits light into one end of the light guide. The image-bearing front surface has continuously variable reflectivity and transmissivity characteristics, with high reflectivity and low transmissivity adjacent portions of the image which are to be illuminated at relatively low intensity or brightness; and, low reflectivity and high transmissivity adjacent portions of the image which are to be illuminated at relatively high intensity. This can, for example, be achieved by forming the image-bearing front surface of an outer image-bearing sheet laminated to an inner sheet of highly reflective perforated material. The inner sheet's apertures are distributed, or the size of the apertures is varied, such that any selected area on the inner sheet is apertured in proportion to the desired intensity of illumination of the image adjacent that selected area. A prismatic film mounted in front of the image-bearing front surface redirects light into the perpendicular viewing direction.

DESCRIPTION

Figure 1:
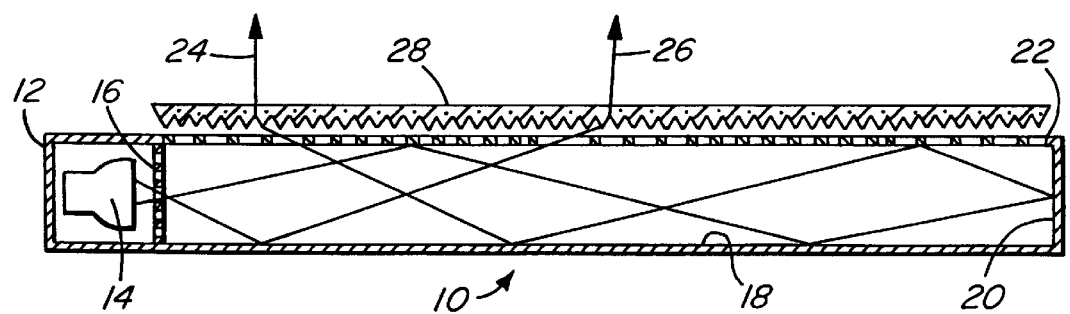
FIG. 1 is a top cross-sectional view of an image display apparatus constructed in accordance with the preferred embodiment of the invention.

FIG. 1 depicts a hollow light guide 10, into which collimated light source 12 emits light. Light source 12 typically comprises a plurality of lamps 14 positioned adjacent an apertured, mirrored end 16 of light guide 10 to emit light into light guide 10 through end 16. This allows lamps 14 to be mounted outside light guide 10 so that they can easily be replaced. Further, the arrangement has a high degree of lamp failure tolerance, in that a single lamp failure will be almost imperceptible to the observer. Such factors are particularly important to image and costconscious advertisers.

Light guide 10 has a highly reflective inner rear surface 18, an end mirror 20 and a non-diffusely transmissive image-bearing front surface 22 having continuously variable reflectivity and transmissivity characteristics. The image-bearing front surface 22 is non-diffusely highly reflective in most regions (indicated in FIG. 1 by the closely spaced dashes forming surface 22), but it is also non-diffusely partially transmissive in such regions. Just enough light is transmitted through such regions to produce the relatively low brightness (i.e. low intensity illumination) required for adequate perception of most portions of the graphic image borne by surface 22. Conversely, front surface 22 has low reflectivity and high transmissivity in the comparatively few regions of surface 22 where relatively high image brightness (i.e. high intensity illumination) is desired (indicated in FIG. 1 by the more widely spaced dashes forming surface 22). Because surface 22 is highly reflective in most regions, most light incident upon the inward facing portion of surface 22 is reflected back into light guide 10 and is thus propagated along light guide 10, where it has an opportunity to encounter one of the few regions of surface 22 where high image brightness is desired, as in the case of light ray 24. Light ray 26 is typical of light rays emitted through image-bearing surface 22 after undergoing comparatively little propagation along light guide 10.

Image-bearing front surface 22 is non-diffusely transmissive. Accordingly, light emitted through surface 22 retains a fairly high level of the collimation imparted by light source 12. The emitted light is re-directed into the perpendicular viewing direction by a sheet of prismatic film 28 mounted in front of surface 22. "2370 3M™ Optical Lighting Film" available from Minnesota Mining and Manufacturing Company, St. Paul, Minn. is suitable for use as prismatic film 28. Prismatic film 28 is made slightly diffuse so that the light is spread over the desired limited angular viewing range mentioned above. Because this range is still quite limited, higher brightness per unit flux is achieved compared to conventionally backlighted image display devices. Although the image perceived by an observer will be bright over a reasonable range of angles, this will not be so for all angles, particularly angles outside the typically restricted field of view mentioned above.

Various techniques can be used to produce image bearing surface 22. For example, surface 22 may comprise an outer image-bearing sheet laminated to an inner sheet of high reflectivity material. The inner sheet can be provided with a plurality of apertures such that for any selected area on the inner sheet, that selected area is apertured in proportion to the desired intensity of illumination of the image adjacent that selected area (i.e. the light transmissivity characteristic of the inner sheet varies in proportion to the desired intensity of illumination of the image). Such variable aperturing of the inner sheet can be achieved by digitally processing the desired image to yield a surface brightness profile which can then be used in computer controlled aperturing of the inner sheet. Alternatively, surface 22 may be a half-tone imaged sheet of highly reflective material such as metallic film, with the density of the image (i.e. the number of dots per square inch used to form the image) varying in proportion to the desired intensity of illumination of the image.

Using digital image processing techniques it is also possible to simplify fabrication of the inner sheet of high reflectivity material in surface 22. For example, it may be more practical for this high reflectivity material to have just two transmissivity values: a uniform low transmissivity value in most regions of the image, and a high value in a few regions corresponding to high image brightness. Such an effect could be achieved by electronic cutting of a uniformly perforated film, for example. In such a case, it will generally be necessary to digitally alter the outer image bearing sheet of surface 22 to appropriately compensate for the discontinuity of transmissivity of the inner high reflectivity sheet.

If image bearing surface 22 has too little overall transmissivity then light guide 10 will have undesirably low efficiency, because only a small fraction of the light will escape. If image bearing surface 22 has too much overall transmissivity then surface 22 will be non-uniformly illuminated, because the light will escape primarily near source 12, which is also undesirable. Thus it is necessary to select a transmissivity distribution which lies intermediate between these extremes and produces the desired image brightness distribution.

In practice, it is relatively easy to create complex image bearing surfaces having the desired variable light transmissivity characteristic. Two or three trial and error iterations using optical prototyping and/or computer ray tracing techniques are normally sufficient.

The invention is well suited to use outdoors in high ambient brightness conditions. For example, in a highway sign, the image may consist of brightly illuminated text and a comparatively dark background. If such a sign is observed against a bright sky, the brightly illuminated text is more easily perceived than in a prior art sign. Alternatively, the image may consist of bright patterns to simulate the "look" of a prior art neon sign.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. Apparatus for displaying a static image, said static image having portions which are to be illuminated at relatively low intensity and portions which are to be illuminated at relatively high intensity, said apparatus comprising:

(a) a hollow light guide having a non-diffusely highly reflective inner rear surface and a non-diffusely partially transmissive, non-diffusely partially reflective front surface, said front surface bearing said static image, said front surface having high reflectivity and low transmissivity adjacent to said portions of said static image which are to be illuminated at relatively low intensity, said front surface having low reflectivity and high transmissivity adjacent to said portions of said static image which are to be illuminated at relatively high intensity;

(b) a light source for emitting light into said light guide; and (c) a prismatic film mounted in front of said front surface.

2. Apparatus as defined in claim 1, wherein said reflectivity and transmissivity characteristics are continuously variable over said front surface.

3. Apparatus as defined in claim 1, wherein said prismatic film is partially diffuse.

4. Apparatus as defined in claim 3, wherein said prismatic film is 2370 3M™ Optical Lighting Film.

5. Apparatus as defined in claim 1, wherein said front surface further comprises an outer sheet and an inner sheet of high reflectivity material, said inner sheet having a plurality of apertures such that for any selected area of said inner sheet, said selected area is apertured in proportion to a desired intensity of illumination of said image adjacent said selected area.

6. Apparatus as defined in claim 1, wherein said front surface further comprises a half-tone imaged sheet of high reflectivity material, wherein for any selected area of said sheet said image density varies in proportion to a desired intensity of illumination of said image adjacent said selected area.

7. Apparatus as defined in claim 1, wherein said light source is positioned adjacent an apertured end of said light guide to emit said light into said light guide through said apertured end.

8. Apparatus as defined in claim 7, wherein said light source comprises a plurality of lamps.

9. A method of displaying a static image, said static image having portions which are to be illuminated at relatively low intensity and portions which are to be illuminated at relatively high intensity, said method comprising the steps of:

(a) applying said static image to a non-diffuse high reflectivity surface, said surface having low transmissivity adjacent to said portions of said static image which are to be illuminated at relatively low intensity, said surface having high transmissivity adjacent to said portions of said static image which are to be illuminated at relatively high intensity;

(b) providing a light guide having a highly reflective inner rear surface and having a light emitting front surface comprising said high reflectivity surface;

(c) emitting light into said light guide for propagation of said light along said light guide and emission through said high reflectivity surface; and, (d) directing light emitted through said high reflectivity surface into a direction substantially perpendicular to said high reflectivity surface.

* * * * *